United States Patent
Tang et al.

(10) Patent No.: US 10,432,043 B2
(45) Date of Patent: Oct. 1, 2019

(54) SLOTTED ROTOR-BRIDGE FOR ELECTRICAL MACHINES

(71) Applicant: Ford Global Technologies, LLC, Dearborn, MI (US)

(72) Inventors: Chun Tang, Canton, MI (US); Wei Wu, Northville, MI (US); Feng Liang, Troy, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 15/381,303

(22) Filed: Dec. 16, 2016

(65) Prior Publication Data

US 2018/0175682 A1 Jun. 21, 2018

(51) Int. Cl.
*H02K 1/27* (2006.01)
*H02K 1/14* (2006.01)
*H02K 3/32* (2006.01)

(52) U.S. Cl.
CPC .......... *H02K 1/2706* (2013.01); *H02K 1/146* (2013.01); *H02K 1/2766* (2013.01); *H02K 3/325* (2013.01); *H02K 2213/03* (2013.01)

(58) Field of Classification Search
CPC .... H02K 1/2706; H02K 1/146; H02K 1/2766; H02K 3/325; H02K 2213/03
See application file for complete search history.

(56) References Cited

U.S. PATENT DOCUMENTS

| | | | |
|---|---|---|---|
| 6,177,745 B1 * | 1/2001 | Narita | H02K 1/2766 310/156.43 |
| 6,777,847 B1 | 8/2004 | Saban et al. | |
| 7,843,101 B2 * | 11/2010 | Ito | H02K 1/2766 310/156.46 |
| 2013/0015727 A1 * | 1/2013 | Iki | H02K 1/246 310/49.43 |
| 2013/0106226 A1 * | 5/2013 | Aoyama | H02K 21/14 310/156.53 |
| 2013/0106227 A1 * | 5/2013 | Aoyama | H02K 21/14 310/156.53 |
| 2013/0106228 A1 * | 5/2013 | Aoyama | H02K 21/14 310/156.53 |
| 2013/0119810 A1 * | 5/2013 | Aoyama | H02K 21/145 310/156.53 |
| 2013/0193783 A1 * | 8/2013 | Aoyama | H02K 21/14 310/51 |
| 2014/0111050 A1 | 4/2014 | Chamberlin | |
| 2015/0115758 A1 * | 4/2015 | Koka | B60L 50/51 310/156.07 |
| 2017/0033624 A1 * | 2/2017 | Kikuchi | H02K 1/2766 |

(Continued)

FOREIGN PATENT DOCUMENTS

IN 01358DE2014 A 6/2015

*Primary Examiner* — Emily P Pham
(74) *Attorney, Agent, or Firm* — David Kelley; Brooks Kushman, P.C.

(57) ABSTRACT

An electric machine having a rotor is disclosed. The rotor defines a cavity containing a magnet, an outer periphery, and a top bridge therebetween that includes at least two slots each having a length in a radial direction. A maximum of the lengths is closest to a Q-axis and a minimum of the lengths is closest to a D-axis. As the electric machine is operating, a rate of change in airgap flux density through the top bridge differs.

20 Claims, 3 Drawing Sheets

(56) References Cited

U.S. PATENT DOCUMENTS

2017/0317540 A1* 11/2017 Laldin .................. H02K 1/2706
2018/0138764 A1*  5/2018 Soler ................... H02K 1/2746
2018/0175685 A1*  6/2018 Tang ................... H02K 1/2766

* cited by examiner

SLOTTED ROTOR-BRIDGE FOR ELECTRICAL MACHINES

TECHNICAL FIELD

The present disclosure relates to a permanent magnet electric machine rotor.

BACKGROUND

Electric machines typically employ a rotor and a stator to produce torque. Electric current flows through windings of the stator to produce a magnetic field. The magnetic field generated by the stator may cooperate with permanent magnets affixed to the rotor to generate torque.

SUMMARY

According to one embodiment of this disclosure, an electric machine having a rotor is disclosed. The rotor defines a cavity containing a magnet, an outer periphery, and a top bridge therebetween that includes at least two slots each having a length in a radial direction. A maximum of the lengths is closest to a Q-axis and a minimum of the lengths is closest to a D-axis. As the electric machine is operating, a rate of change in airgap flux density through the top bridge differs.

A wave form associated with the airgap flux density may increase and decrease in a stepped fashion.

The rate of change of rotor air gap flux density may result in a reduction of torque ripple and iron loss.

The electric machine may also include a stator circumferentially surrounding the rotor. The rotor and the stator may each generate a magnetic field that interacts to define a harmonic level. As the harmonic level increases, torque ripple and iron loss increase. The harmonic level may be at least based on airgap flux density.

A first of the at least two slots closest to the Q-axis may be spaced apart from the outer periphery by a first distance and a second of the at least two slots is spaced apart from the outer periphery by a second distance. The first distance may be less than the second distance.

A major axis of each of the at least two slots may be arranged radially with respect to an axis of rotation of the rotor.

The at least two slots may have a rectangular shape with rounded corners.

The at least two slots may have an oval, rhombus, hexagon or other irregular shape.

According to another embodiment of this disclosure, an electric machine having a rotor is disclosed. The rotor defines a cavity containing a magnet, an outer periphery and a top bridge therebetween. The rotor includes at least two slots each having a width. The maximum of the widths is closest to a D-axis, a minimum of the widths is closest to a Q-axis, and each width monotonically decreases from the maximum to the minimum.

The monotonically decreasing widths of the at least two slots may result in a stepped rate of change in airgap flux density through the top bridge during operation.

The stepped rate of change may act to cancel a harmonic level defined by the electric machine to reduce torque ripple and iron loss.

The two slots may have a rectangular shape with rounded corners.

The rotor may also include a third slot. The first of the at least two slots and a second slot of the at least two slots may be spaced apart by a first distance, and a second of the at least two slots and the third slot may be separated by a second distance. The first distance may be greater than or equal to the second distance.

A first of the at least two slots closest to the D-axis may be spaced apart from the outer periphery by a first distance and a second of the at least two slots may be spaced apart from the outer periphery by a second distance. The first distance may be greater than the second distance.

The slot closest to the D-axis has a length $H_1$ and a width $W_1$, and $H_1$ is greater than or equal to $W_1$, and wherein the slot closest to the Q-axis has a length $H_3$ and a width $W_3$, and $W_3$ is less than $H_3$.

Each of the at least two slots may have a major axis arranged substantially perpendicular to the outer periphery of the rotor.

DETAILED DESCRIPTION

Figure 1:
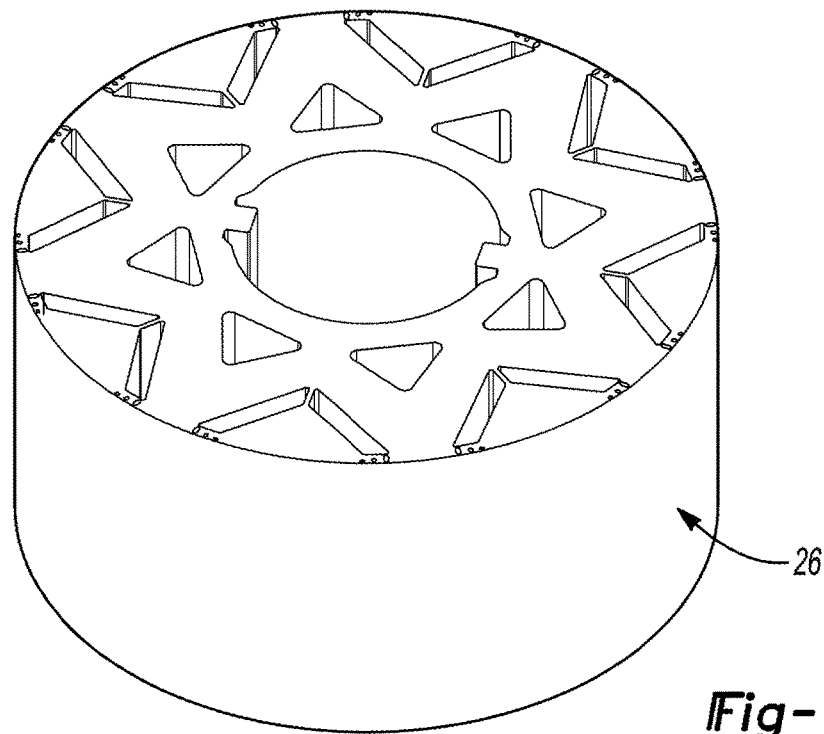
FIG. 1 is a perspective view of a stack of laminations of a rotor of an electric machine.

Permanent magnet machines feature magnets mounted on or embedded within a rotor surrounded by a stator. The magnets mounted on or embedded in the rotor couple with the motor's current-induced, internal magnetic fields generated by electrical input to the stator. Similar to other alternating current (AC) induction motors, electrical power is supplied through the stator windings.

Permanent magnets of the rotor may be positioned or oriented in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The internal portion of the "V" has similar magnetic poles that cooperate to form a magnetic pole of the rotor. Each of the permanent magnets may be disposed in pockets or cavities to retain the permanent magnets. These pockets or cavities are typically rectangular and sized to receive the permanent magnets. The cavities may be slightly oversized at opposite ends to limit magnetic flux leakage between north and south poles of the individual permanent magnets. Voids or cavities in the rotor core impede magnetic flux because a vacuum has a relatively low magnetic permeability compared to the rotor core material (e.g., electric steel).

Separate groups of stator teeth and the stator windings form multiple magnetic poles that produce a flux flow pattern when the stator coils are energized with a multi-phase sinusoidal voltage. A three-phase electric machine, for example, would have a total of 8 poles and 48 slots. A group of 6 slots would be characteristic of each pole of the particular examples of a 48 slot electric machine herein disclosed. The magnetic flux created by the stator windings interacts with rotor flux created by the permanent magnets in a rotor of a permanent magnet machine, so that a rotor torque is created as the stator windings are excited with a multi-phase voltage.

The torque created by the stator windings and the rotor flux field develops a uniform torque component and a varying torque component. The total output torque of the electric machine is a combination of both components. Because of the variable torque component, a torque ripple phenomenon is created, which results in motor torque output speed oscillations when the electric machine is acting as a motor. Torque ripple in electric motors is caused by the interaction between the harmonic magnetic fluxes produced by the permanent magnets and the current in the stator winding. Reduction in the harmonic flux produced by the permanent magnet will lead to a reduction in the torque ripple as well as the iron loss.

For most applications, the torque ripple needs to be reduced to a manageable level, particularly in the case of hybrid electric vehicle powertrain applications where the torque ripple components occur at variable frequencies proportional to the output shaft speed of an electric traction motor. Higher order of frequencies usually can be filtered out by a limited bandwidth in the mechanical components of the powertrain. Lower frequencies, however, give rise to mechanical oscillations that cannot readily be filtered. Such oscillations are not acceptable in a hybrid electric vehicle powertrain. Presence of torque ripples from the motor at the lower frequencies may cause the motor to produce undesirable vibration and noise.

In general, rotor laminations may have pockets or cavities arranged around the periphery of the rotor to house permanent magnets. The permanent magnets may be situated to interact with the magnetic field generated by the stator windings. These pockets or cavities may include flux-limiting areas to minimize undesired flux leakage between magnets.

The shape of the rotor and its associated cavities has an effect on the flux distribution along the surface of the rotor. The distribution of flux affects the torque ripple and iron loss of the electric machines. The shape of the rotor has a gradually changing top bridge width. The gradual change of the top bridge width results in a smooth change of reluctance along the bridge. This effectively reduces the rotor flux harmonics such that a reduction in torque ripples and iron loss is achieved. The size and shape of the cavities within the rotor as claimed are aimed at reducing the iron loss within permanent magnet motors.

Magnetic saturation occurs when a greater magnetic field is applied. No further or minimal magnetization of the material occurs. In the conventional permanent magnet rotor designs, the width of the top bridge is substantially uniform between. As a result, the flux density increases rapidly in the regions at both ends of the bridge, which creates harmonic fluxes in the air gap. The rapid flux change may be reduced by introducing cavities into the bridge to smooth the reluctance change along the bridge. This reduction in the flux change rate is capable of reducing torque ripple by 20% to 30%. Iron loss can also be reduced upwards of 10% to 15%.

TABLE 1

| Attribute | Decrease From Baseline Conventional Flat Bridge |
| --- | --- |
| Torque Ripple | −20%-30% |
| Iron Loss at Field-Weakening Condition | −10%-15% |

Figure 2:
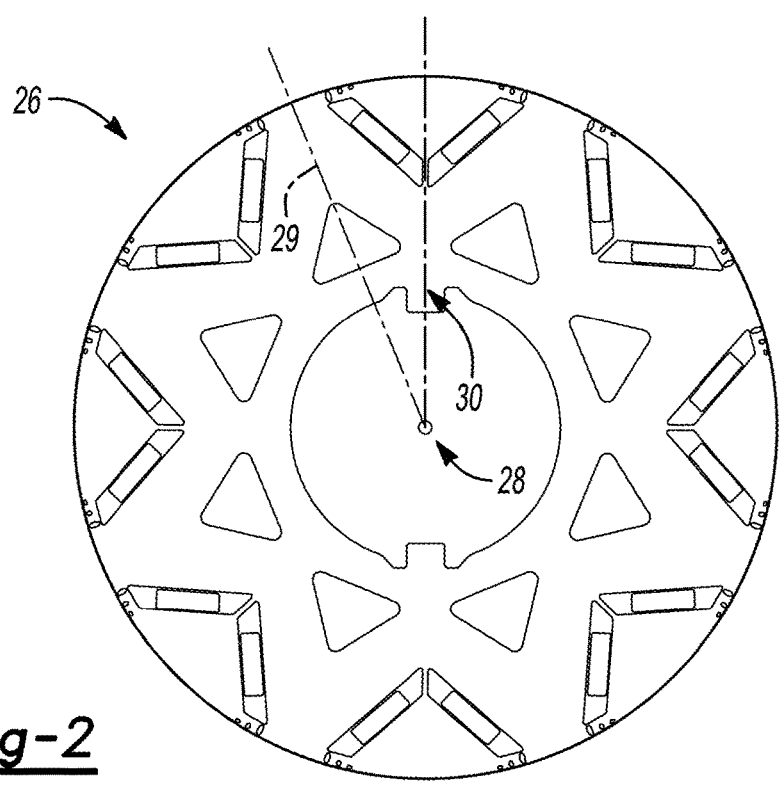
FIG. 2 is a top view of a lamination.

Referring to FIG. 2, a top view of a rotor 26 surrounded by a stator 32 for an eight-pole machine is illustrated. The rotor 26 includes a magnet cavity 24. The rotor 26 is preferably a circular sheet of electromagnetic-permeable metal. A direct axis (D-axis) 30 bisects two of the cavities 24 (FIG. 2A) that are spaced apart from each other. A quadrature axis (Q-axis) 29 is shown extending from the center point 28 along an electric angle approximately 90° (with respect to the D-axis, while the Q-axis is shown as 22.5 mechanical degrees for the example rotor shown).

Figure 2A:
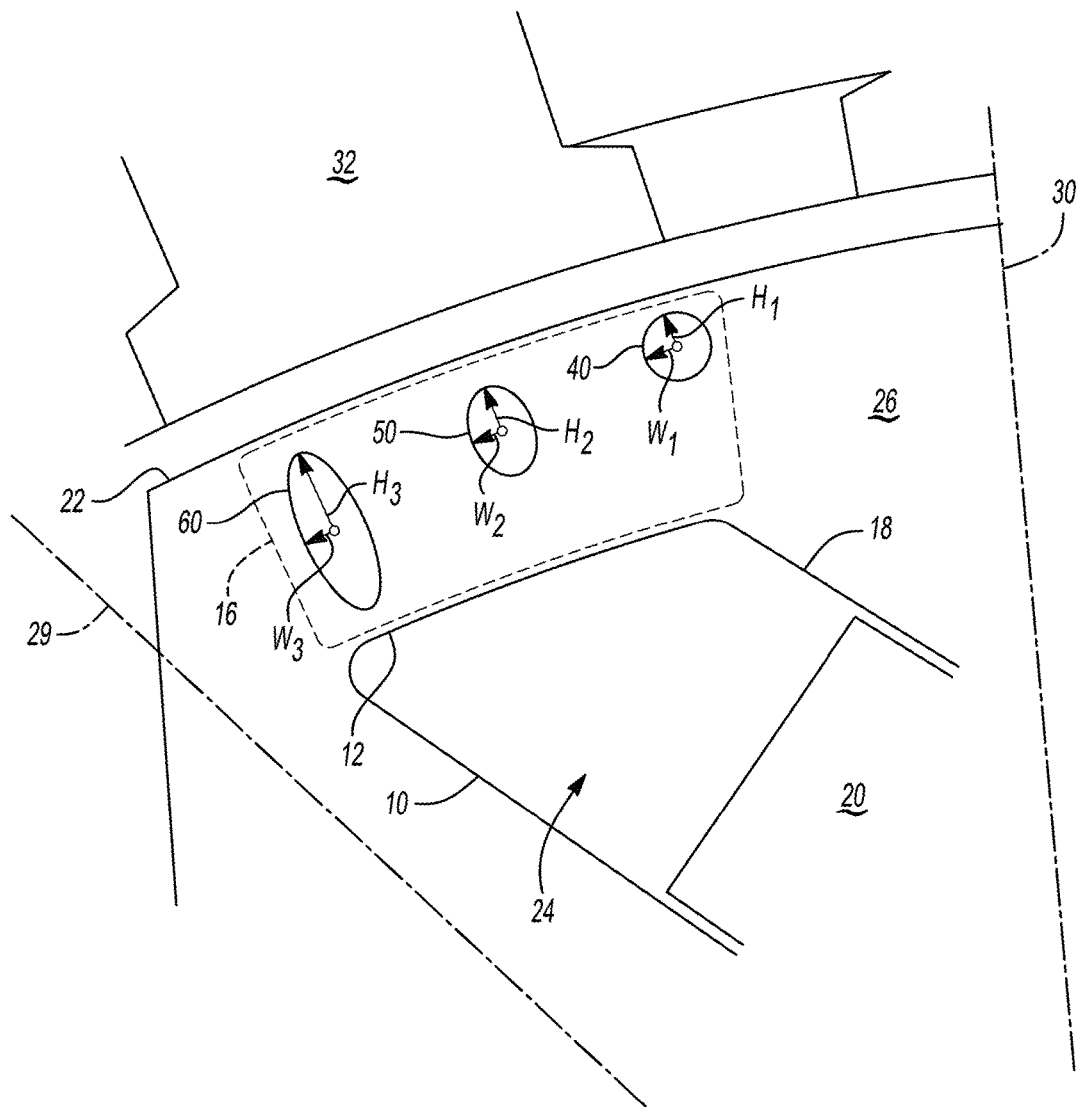
FIG. 2A is a detailed view of the lamination.

Referring to FIG. 2A, a detailed view taken along the circled area 2A is illustrated. A stator 32 circumferentially surrounds a rotor 26. The rotor 26 defines a magnet cavity 24. The magnet cavity 24 is comprised of a first leg 10 and a second leg 18. The first leg 10 and second leg 18 are spaced apart such that the magnet cavity 24 is sized to receive a magnet 20. The first leg 10 and second leg 18 are connected together by a first section 12. A top bridge 16 is an area between the outer periphery 22 of the cavity 24 and the first section 12 of the cavity 24. A first slot 40 is disposed within the top bridge 16 and is located closest to the D-axis 30. The first slot 40 preferably has a width of $W_1$ and a radial length of $H_1$. The first slot 40 is positioned in the top bridge 16 and closest to the D-axis 30 as compared to the second slot 50 and third slot 60. A second slot 50 is disposed within the top bridge 16. The second slot 50 is disposed between the cavity 24 and the outer periphery 22. The second slot 50 has a radial length $H_2$ and a width $W_2$. The height $H_2$ is greater than the height of the first slot $H_1$. A third slot 60 is positioned within the top bridge 16, between the outer periphery 22 and the cavity 24. The third slot 60 has a width $W_3$ and a height $H_3$. The radial length $H_3$ of the third slot 60 is greater than the radial length $H_2$ of the second slot 50. The slots may take any shape, so long as the height of the slots decreases according to their position relative to the D-Axis 30. The closer the slot is to the Q-axis 29 with respect to the other cavities, the larger the radial length of the slot is.

The slots may be spaced apart at a predetermined distance. For instance, the first slot 40 and the second slot 50 are spaced apart by a distance, a. The second slot 50 and the third slot 60 are separated by a distance, b. The distance a is greater than or equal to the distance of b.

Figure 3:
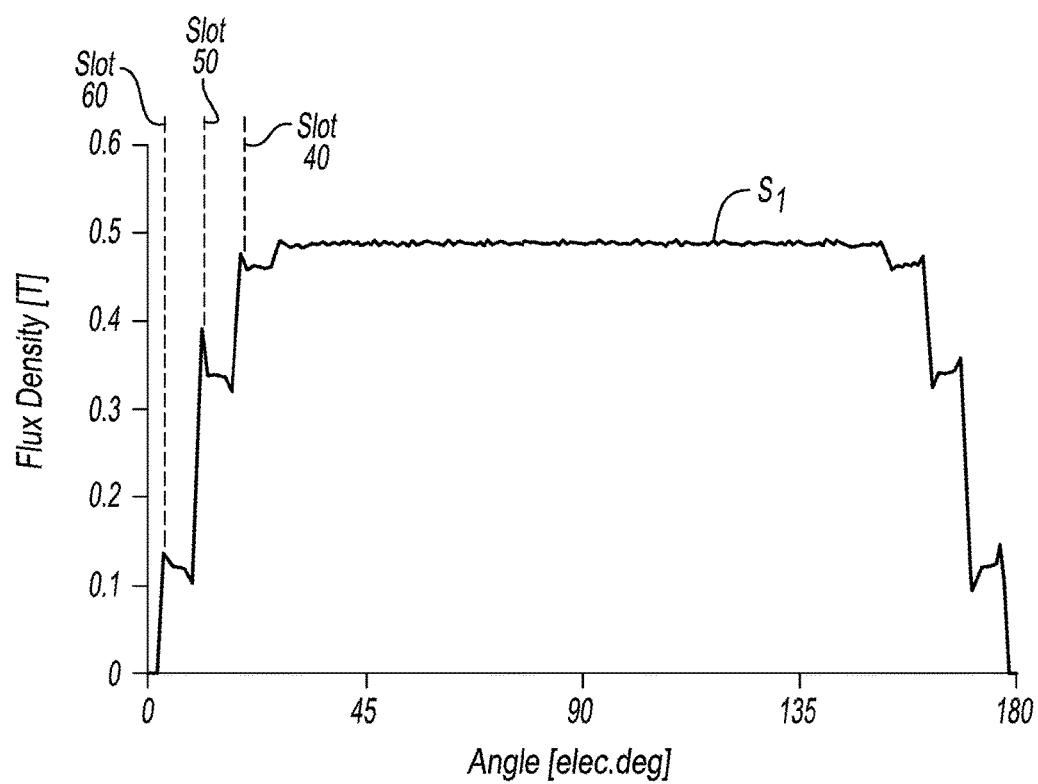
FIG. 3 is a graph of the airgap flux density versus angle for the attribute.

Referring to FIG. 3, a graph depicting a measure of airgap flux density, measured in Tesla [T] versus angular degree, measured in electric degrees is shown. The shape and size of the slots create a stepped or gradual change of the airgap flux density as the flux density approaches the peak value. The first portion of the graph shows an increase in the air-gap flux density and a gradual decrease. This increase and gradual decrease is due to the first slot 40. The same can be said of the second and third portions of the graph. Each of the slots results in an increase and gradual decrease of the air-gap flux density before reaching the peak value. The gradual change between zero degrees and 25 degrees is specific to the rotor 26 having three slots as discussed above. This gradual change in air-gap flux density results in a lower harmonic flux level, resulting in a decrease in torque ripple.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
a rotor provided with a cavity containing a magnet, an outer periphery, and a top bridge therebetween, the top bridge including at least two slots each having a length in a radial direction, a maximum of the lengths being closest a Q-axis and a minimum of the lengths being closest a D-axis.

2. The rotor of claim 1, wherein a wave form associated with the airgap flux density increases and decreases in a stepped fashion.

3. The rotor of claim 1, wherein the rate of change results in a reduction of torque ripple and iron loss.

4. The rotor of claim 3, further comprising a stator circumferentially surrounding the rotor, wherein the rotor and the stator each generate a magnetic field that interact to define a harmonic level, and wherein as the harmonic level increases torque ripple and iron loss increase.

5. The rotor of claim 4, wherein the harmonic level is at least based on air gap flux density.

6. The rotor of claim 1 further comprising a third slot closest to the Q-axis, wherein a first of the at least two slots and a second of the at least two slots are spaced apart a first distance, wherein the second of the at least two slots and the third slot are spaced apart a second distance, and wherein the first distance is greater than or equal to the second distance.

7. The rotor of claim 1, wherein a first of the at least two slots closest to the Q-axis is spaced apart from the outer periphery by a first distance and a second of the at least two slots is spaced apart from the outer periphery by a second distance, and wherein the first distance is less than or equal to the second distance.

8. The rotor of claim 1, wherein a first of the at least two slots closest to the D-axis has a length $H_1$ and a width $W_1$, and $H_1$ is greater than $W_1$, and wherein a second of the at least two slots closest to the Q-axis has a length $H_2$ and a width $W_2$, and $W_2$ is less than or equal to $H_2$.

9. The rotor of claim 1, wherein a major axis of each of the at least two slots is arranged radially with respect to an axis of rotation of the rotor.

10. The rotor of claim 1, wherein the at least two slots have a rectangular shape with rounded corners.

11. The rotor of claim 1, wherein the at least two slots have an oval shape.

12. An electric machine comprising:
a rotor including a cavity containing a magnet, an outer periphery and a top bridge therebetween, the top bridge including at least two slots each having a width, a maximum of the widths being closest to a D-axis, a minimum of the widths being closest to a Q-axis, and each width monotonically decreasing from the maximum to the minimum.

13. The electric machine of claim 12, wherein the monotonically decreasing widths of the at least two slots result in a stepped rate of change in airgap flux density through the top bridge during operation.

14. The rotor of claim 13, wherein the stepped rate of change acts to cancel a harmonic level defined by the electric machine to reduce torque ripple and iron loss.

15. The rotor of claim 12, wherein the at least two slots have a rectangular shape with rounded corners.

16. The rotor of claim 12, wherein the at least two slots have a substantially oval shape.

17. The rotor of claim 12, further comprising a third slot closest to Q-axis, wherein a first of the at least two slots and the third slot are spaced apart by a first distance, and a second of the at least two slots and the third slot are separated by a second distance, and wherein the first distance is greater than or equal to the second distance.

18. The rotor of claim 12, wherein a first of the at least two slots closest to the D-axis is spaced apart from the outer periphery by a first distance and a second of the at least two slots is spaced apart from the outer periphery by a second distance, and wherein the first distance is greater than or equal to the second distance.

19. The rotor of claim 12, wherein the slot closest to the D-axis has a length $H_1$ and a width $W_1$, and $H_1$ is greater than or equal to $W_1$, and wherein the slot closest to the Q-axis has a length $H_3$ and a width $W_3$, and $W_3$ is less than $H_3$.

20. An electric machine comprising:
a rotor including a cavity containing a magnet, an outer periphery and a top bridge therebetween, the top bridge including a plurality of slots each having a length and width, a maximum of the lengths being closest to a Q-axis, a minimum of the lengths being closest to a D-axis, and each of the lengths and widths monotonically decreasing from the maximum to the minimum.

* * * * *